United States Patent
Shavell et al.

(10) Patent No.: US 10,200,499 B1
(45) Date of Patent: Feb. 5, 2019

(54) SYSTEMS AND METHODS FOR REDUCING NETWORK TRAFFIC BY USING DELTA TRANSFERS

(71) Applicant: Symantec Corporation, Mountain View, CA (US)

(72) Inventors: Michael Shavell, Merrimack, NH (US); Gregory Chagnon, Danvers, MA (US)

(73) Assignee: Symantec Corporation, Mountain View, CA (US)

( * ) Notice: Subject to any disclaimer, the term of this patent is extended or adjusted under 35 U.S.C. 154(b) by 238 days.

(21) Appl. No.: 14/609,465

(22) Filed: Jan. 30, 2015

(51) Int. Cl.
*H04L 29/08* (2006.01)

(52) U.S. Cl.
CPC ............ *H04L 67/327* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 7,188,214 B1 * | 3/2007 | Kasriel | G06F 17/30902 707/E17.12 |
| 7,197,433 B2 | 3/2007 | Patel et al. | |
| 7,305,429 B2 | 12/2007 | Borella | |
| 8,516,193 B1 | 8/2013 | Clinton et al. | |
| 8,589,543 B2 | 11/2013 | Dutta et al. | |
| 8,732,267 B2 | 5/2014 | Banerjee et al. | |
| 8,984,161 B2 | 3/2015 | Nagpal et al. | |
| 9,075,660 B2 | 7/2015 | Guo et al. | |
| 9,086,928 B2 | 7/2015 | Tung et al. | |
| 9,229,784 B2 | 1/2016 | DeJana et al. | |
| 9,294,371 B2 | 3/2016 | Tung et al. | |
| 9,300,539 B2 | 3/2016 | DeJana et al. | |
| 2004/0133630 A1 | 7/2004 | Coles et al. | |
| 2005/0055437 A1 | 3/2005 | Burckart et al. | |
| 2005/0081039 A1 | 4/2005 | Lee et al. | |

(Continued)

OTHER PUBLICATIONS

Michael Shavell, et al.; Systems and Methods for Sending Push Notifications That Include Preferred Data Center Routing Information; U.S. Appl. No. 14/868,324, filed Sep. 28, 2015.

(Continued)

*Primary Examiner* — Kevin T Bates
*Assistant Examiner* — Lesa M Kennedy
(74) *Attorney, Agent, or Firm* — FisherBroyles, LLP

(57) ABSTRACT

The disclosed computer-implemented method for reducing network traffic by using delta transfers may include (1) receiving, from a client device, an original request message that requests at least one action from a server, (2) storing the original request message to serve as a foundation for a delta transfer that includes the original request message and at least one subsequent request message that builds upon the original request message, (3) receiving, from the client device, a subsequent request message that excludes at least a portion of the original request message to reduce redundancy between the original request message and the subsequent request message, and (4) applying the subsequent request message to the original request message to achieve the delta transfer while reducing the redundancy between the original request message and the subsequent request message. Various other methods, systems, and computer-readable media are also disclosed.

20 Claims, 6 Drawing Sheets

(56) References Cited

U.S. PATENT DOCUMENTS

| | | | |
|---|---|---|---|
| 2005/0114711 A1* | 5/2005 | Hesselink | H04L 63/0209 726/4 |
| 2005/0223163 A1 | 10/2005 | Ogasawara et al. | |
| 2006/0072721 A1* | 4/2006 | Wisniewski | G06F 17/30905 379/88.22 |
| 2007/0160030 A1 | 7/2007 | Cruz | |
| 2008/0127306 A1 | 5/2008 | Blumfield et al. | |
| 2008/0127339 A1 | 5/2008 | Swain et al. | |
| 2008/0225862 A1* | 9/2008 | Wartenberg | H04L 69/04 370/400 |
| 2009/0006641 A1 | 1/2009 | Yaqoob et al. | |
| 2009/0031128 A1 | 1/2009 | French et al. | |
| 2010/0118770 A1* | 5/2010 | Harindranath | H04Q 3/0025 370/328 |
| 2010/0161714 A1 | 6/2010 | Dongre | |
| 2010/0217801 A1 | 8/2010 | Leighton et al. | |
| 2010/0274922 A1 | 10/2010 | Reavely | |
| 2011/0010456 A1 | 1/2011 | Saeki | |
| 2011/0265159 A1 | 10/2011 | Ronda et al. | |
| 2011/0311051 A1 | 12/2011 | Resch et al. | |
| 2012/0054851 A1 | 3/2012 | Piazza et al. | |
| 2012/0117160 A1* | 5/2012 | Bickson | H04L 67/02 709/206 |
| 2012/0131083 A1 | 5/2012 | Goddard et al. | |
| 2012/0289239 A1 | 11/2012 | Luna et al. | |
| 2012/0323990 A1 | 12/2012 | Hayworth | |
| 2013/0055091 A1 | 2/2013 | Dutta et al. | |
| 2013/0073716 A1 | 3/2013 | DeJana et al. | |
| 2013/0103646 A1 | 4/2013 | Nagpal et al. | |
| 2013/0179567 A1 | 7/2013 | Leighton et al. | |
| 2013/0262681 A1 | 10/2013 | Guo et al. | |
| 2013/0268673 A1* | 10/2013 | Graham-Cumming | H04L 67/2828 709/226 |
| 2013/0339949 A1 | 12/2013 | Spiers et al. | |
| 2014/0052772 A1* | 2/2014 | Hourselt | G06F 17/3089 709/203 |
| 2014/0172961 A1 | 6/2014 | Clemmer et al. | |
| 2014/0280818 A1 | 9/2014 | Kim et al. | |
| 2015/0195347 A1 | 7/2015 | Luft | |
| 2016/0057077 A1 | 2/2016 | Gomatam et al. | |

OTHER PUBLICATIONS

Geraci, Austin, "GTM vs LTM—Difference between F5 Global & Local Traffic Manager", http://worldtechit.com/gtm-vs-ltm-difference-f5-global-local-traffic-manager/, as accessed Sep. 2, 2015, Worldtech IT, LLC, (Oct. 1, 2014).

Keith Newstadt, et al; Systems and Methods for Consolidating Long-Polling Connections; U.S. Appl. No. 14/022,222, filed Sep. 10, 2013.

Michael Shavell; Systems and Methods for Protecting Notification Messages; U.S. Appl. No. 14/687,941, filed Apr. 16, 2015.

"XEP-0326: Internet of Things—Concentrators", http://xmpp.org/extensions/xep-0326.html, as accessed Jun. 29, 2013, (Jun. 14, 2013).

"How to disable all notifications and scan progress on Symantec Endpoint Protection (SEP) 12.1 unmanaged client", https://support.symantec.com/en_US/article.TECH172737.html, as accessed Dec. 9, 2014, Article: TECH172737, Symantec Corporation, (Jul. 28, 2012).

"List of HTTP header fields", http://en.wikipedia.org/wiki/List_of_HTTP_header_fields, as accessed Dec. 9, 2014, Wikipedia, (Jul. 24, 2010).

Guzel, Burak "HTTP Headers for Dummies", http://code.tutsplus.com/tutorials/http-headers-for-dummies--net-8039, as accessed Dec. 9, 2014, (Dec. 9, 2009).

Rouse, Margaret "payload", http://searchsecurity.techtarget.com/definition/payload, as accessed Dec. 9, 2014, (May 18, 2011).

"What's the difference between a POST and a PUT HTTP REQUEST?", http://stackoverflow.com/questions/107390/whats-the-difference-between-a-post-and-a-put-http-request, as accessed Dec. 9, 2014, (Sep. 20, 2008).

"Hypertext Transfer Protocol", http://en.wikipedia.org/wiki/Hypertext_Transfer_Protocol, as accessed Dec. 9, 2014, Wikipedia, (Oct. 8, 2005).

"What information appears in event logs? (Event Viewer)", http://windows.microsoft.com/en-us/windows/what-information-event-logs-event-viewer#1TC=windows-7, as accessed Dec. 9, 2014, Microsoft, (Dec. 15, 2013).

Michael Shavell, et al.; Method or Mechanism for Long Lived Connection Migration; U.S. Appl. No. 14/493,013, filed Sep. 22, 2014.

Michael Shavell, et al.; Method or mechanism for reduction in throughput for HTTP utilizing Long Polling with a distribution; U.S. Appl. No. 14/571,257, filed Dec. 15, 2014.

* cited by examiner

SYSTEMS AND METHODS FOR REDUCING NETWORK TRAFFIC BY USING DELTA TRANSFERS

BACKGROUND

Contemporary web servers may simultaneously send and/or receive data from a staggering number of client computers. In some instances, a web server may be exchanging data with millions of client computers at a time. Not surprisingly, the amount of network traffic at such a web server may reach a very high level. Accordingly, a high number of network connections established with the web server may significantly slow network data transmission or, if the web server is saturated, even prevent some client computers from establishing a new network connection with the web server.

In some instances, a given client computer may send multiple requests to a web server in succession. These multiple requests may have a certain amount of redundancy with respect to one another. As a result, some of the network traffic may result from the transmission of data that has already been transmitted from a client computer. The instant disclosure, therefore, identifies and addresses a need for additional and improved systems and methods for reducing network traffic by eliminating certain redundancies among transmissions originating from a client computer.

SUMMARY

As will be described in greater detail below, the instant disclosure describes various systems and methods for reducing network traffic using delta transfers such that the messages exchanged between a device and a server exclude certain redundancies.

In one example, a computer-implemented method for reducing network traffic by using delta transfers may include (1) receiving, from a client device, an original request message that requests at least one action from a server, (2) storing the original request message to serve as a foundation for a delta transfer that may include the original request message and at least one subsequent request message that builds upon the original request message, (3) receiving, from the client device, a subsequent request message that excludes at least a portion of the original request message to reduce redundancy between the original request message and the subsequent request message, and then (4) applying the subsequent request message to the original request message to achieve the delta transfer while reducing the redundancy between the original request message and the subsequent request message.

In some examples, storing the original request message may include caching the original request message at the server in anticipation of applying the subsequent request message to the original request message to achieve the delta transfer.

Examples of the action requested by the original request message include, without limitation sending a software update for software installed on the client device, sending a notification to the client device, changing a policy for sending notifications to the client device, scanning the client device, updating information on the server that describes a configuration of the client device, receiving information describing a change in a status of the client device, forwarding a log event to the client device, variations of one or more of the same, combinations of one or more of the same, or any other suitable action.

Examples of the portion of the original request message excluded by the subsequent request message include, without limitation, information describing hardware of the client device, information describing software of the client device, registration information of the client device, information to be used by the server in performing an action requested by the subsequent request message, variations of one or more of the same, combinations of one or more of the same, or any other suitable portion of the original request message. In one example, the portion of the original request message excluded by the subsequent request message may include at least a portion of a header field of the original request message and/or at least a portion of a payload of the original request message.

In one example, the original request message and/or the subsequent request message may include a HyperText Transfer Protocol (HTTP) request. In one example, at least one of the original request message and the subsequent request message may include an HTTP POST request, an HTTP GET request, and/or an HTTP PUT request.

In one example, receiving the original request message may include receiving an indication that the client device is able to facilitate delta transfers. In this example, storing the original request message may include storing, in response to the indication that the client device is able to facilitate delta transfers, the original request message at the server in anticipation of receiving the subsequent request message to achieve the delta transfer.

In some examples, the original request message may include a pre-defined header that may include the indication that the client device is able to facilitate delta transfers. In one embodiment, the subsequent request message may include a request message processed by the client device to exclude at least some content that is redundant to content included in the original request message.

In one example, the method may further include sending an original response message to the client device. In this example, the method may also include sending, to the client device, a subsequent response message that excludes at least a portion of the original response message to reduce redundancy between the original response message and the subsequent response message.

In one example, sending the original response message to the client device may include sending the original response message using an HTTP persistent connection. Additionally or alternatively, sending the subsequent response message may include sending the subsequent response message using an HTTP persistent connection. In some examples, the method may further include, prior to sending the subsequent response message, creating the subsequent response message by excluding information that identifies an entity or a channel from the subsequent response message.

In one example, receiving the subsequent request message may include receiving a request message that includes an instruction directing the server to add content to the original request message and/or subtract content from the original request message. In this example, applying the subsequent request message to the original request message may include adding content to the original request message based at least in part on the instruction and/or subtracting content from the original request message based at least in part on the instruction.

As another example, a system for implementing the above-described method may include (1) a receiving module, stored in memory, that receives, from a client device, an original request message that requests at least one action from a server, (2) a storage module, stored in memory, that stores the original request message to serve as a foundation for a delta transfer that may include the original request message and at least one subsequent request message that builds upon the original request message, (3) wherein the receiving module receives, from the client device, a subsequent request message that excludes at least a portion of the original request message to reduce redundancy between the original request message and the subsequent request message, (4) a delta module, stored in memory, that applies the subsequent request message to the original request message to achieve the delta transfer while reducing the redundancy between the original request message and the subsequent request message, and (5) at least one physical processor configured to execute the receiving module, the storage module, and the delta module.

As a further example, the above-described method may be encoded as computer-readable instructions on a non-transitory computer-readable medium. For example, a computer-readable medium may include one or more computer-executable instructions that, when executed by at least one processor of a computing device, causes the computing device to (1) receive, from a client device, an original request message that requests at least one action from a server, (2) store the original request message to serve as a foundation for a delta transfer that may include the original request message and at least one subsequent request message that builds upon the original request message, (3) receive, from the client device, a subsequent request message that excludes at least a portion of the original request message to reduce redundancy between the original request message and the subsequent request message, and then (4) apply the subsequent request message to the original request message to achieve the delta transfer while reducing the redundancy between the original request message and the subsequent request message.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
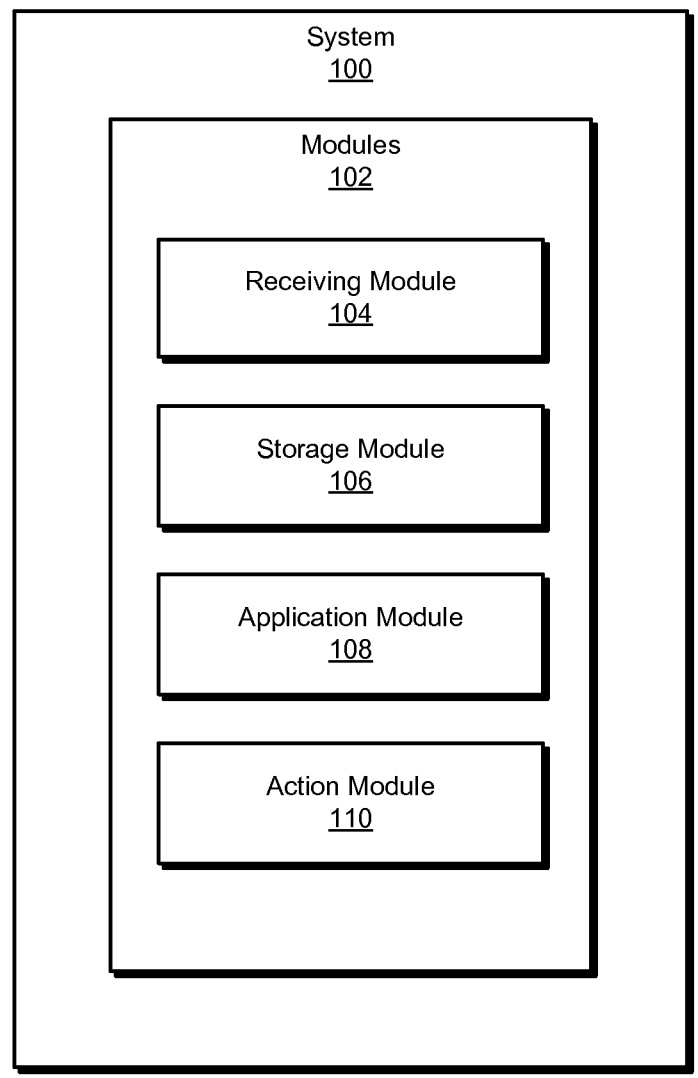
FIG. 1 is a block diagram of an exemplary system for reducing network traffic by using delta transfers.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for reducing network traffic by using delta transfers. As will be explained in greater detail below, by excluding certain redundant content from messages transmitted across a network, the systems and methods described herein may reduce the amount of network traffic and the amount of bandwidth consumed by such network traffic. As a result, the systems and methods described herein may reduce network overhead and latency. In some examples, the amount of content excluded from a given message may be small and have little effect on network traffic. However, in the aggregate, the amount of content excluded from a large number of messages may be significant enough to meaningfully reduce overall network traffic, bandwidth consumption, network overhead, and/or latency.

Figure 2:
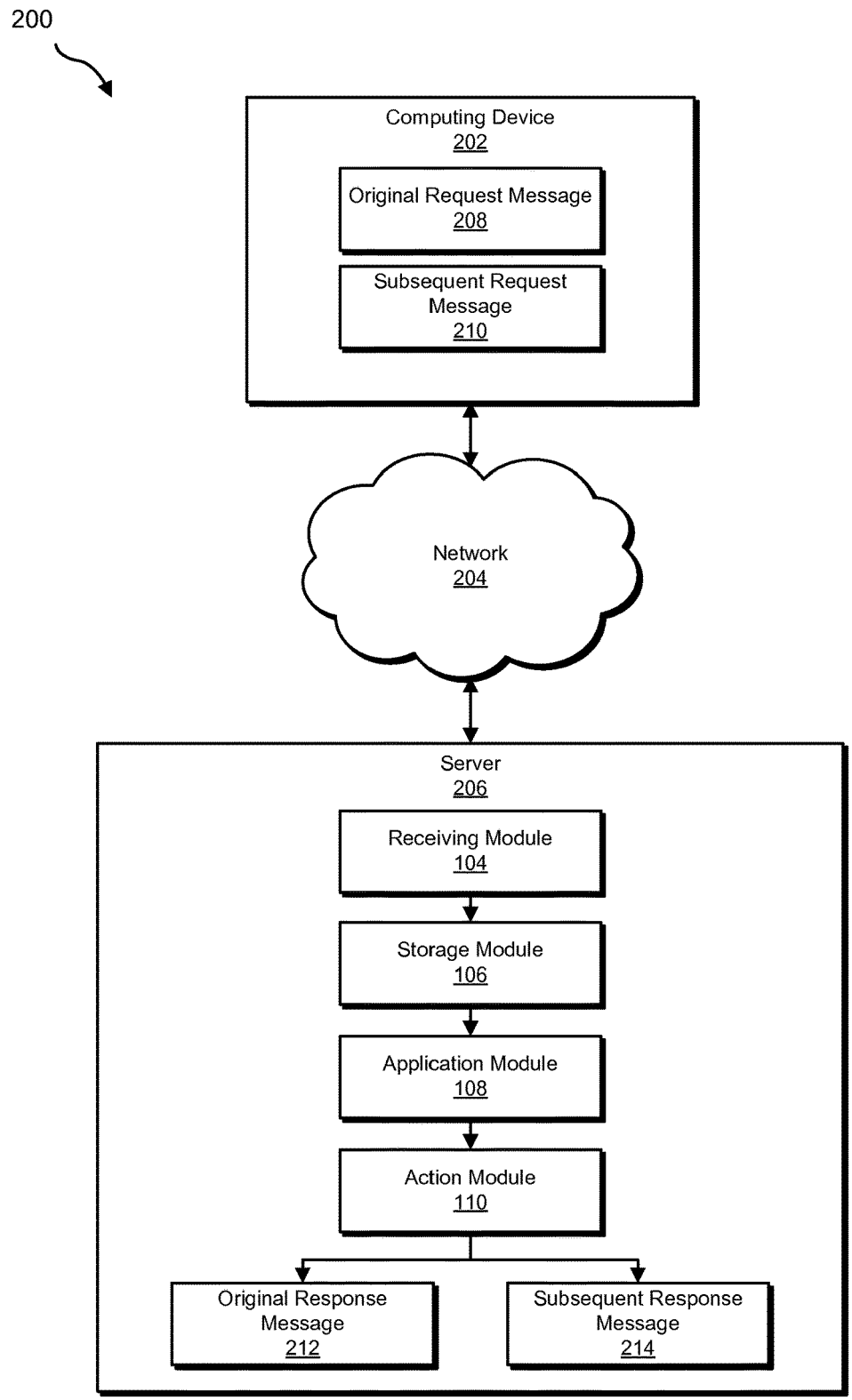
FIG. 2 is a block diagram of an additional exemplary system for reducing network traffic by using delta transfers.

The following will provide, with reference to FIGS. 1-2, detailed descriptions of exemplary systems for reducing network traffic by using delta transfers. Detailed descriptions of corresponding computer-implemented methods will also be provided in connection with FIG. 3. Detailed descriptions of an exemplary original request message, an exemplary subsequent request message, and an exemplary delta transfer will be described in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for reducing network traffic by using delta transfers. As illustrated in this figure, exemplary system 100 may include one or more modules 102 for performing one or more tasks. For example, and as will be explained in greater detail below, exemplary system 100 may include a receiving module 104 that receives, from a client device, an original request message that requests at least one action from a server. Additionally or alternatively, receiving module 104 may receive a subsequent request message that excludes at least a portion of the original request message.

Exemplary system 100 may additionally include a storage module 106 that stores the original request message to serve as a foundation for a delta transfer that includes the original request message and at least one subsequent request message that builds upon the original request message. Moreover, exemplary system 100 may include a delta module 108 that applies the subsequent request message to the original request message to achieve the delta transfer while reducing the redundancy between the original request message and the subsequent request message. Furthermore, exemplary system 100 may include an action module 110 that performs an action requested in the original request message and/or the subsequent request message. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to reduce network traffic by using delta transfers. For example, and as will be described in greater detail below, receiving module 104 may receive, from a client device such as computing device 202, an original request message 208 that requests at least one action from server 206. Storage module 106 may then store original request message 208 to serve as a foundation for a delta transfer that includes original request message 208 and at least one subsequent request message that builds upon the original request message. Next, receiving module 104 may receive, from computing device 202, a subsequent request message 210 that excludes at least a portion of original request message 208 to reduce redundancy between original request message 208 and subsequent request message 210. Delta module 108 may then apply subsequent request message 210 to original request message 208 to achieve the delta transfer while reducing the redundancy between original request message 208 and subsequent request message 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device. In some examples, computing device 202 may represent a customer device of a service provider that manages server 206.

Server 206 generally represents any type or form of computing device that is capable of reducing network traffic by using delta transfers. Examples of server 206 include, without limitation, application servers, webservers, cloud-based servers, network devices, storage servers, and/or database servers configured to run certain software applications and/or provide various web, cloud, network, storage, and/or database services. In some examples, server 206 may be configured and/or managed by a security service provider. In on example, server 206 may service customer endpoints such as computing device 202. In some examples, server 206 may utilize an endpoint management platform.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Original request message 208 generally represents any type or form of digital message and/or transmission packet and/or portion of a digital message and/or transmission packet that includes data, metadata, and/or information. In some embodiments, original request message 208 may represent a HyperText Transfer Protocol (HTTP) request. Examples of original request message 208 include, without limitation, an HTTP request, an HTTP POST request, and HTTP GET request, an HTTP PUT request, variations of one or more of the same, combinations of one or more of the same, or any other suitable request message.

In some examples, original request message 208 may include a header field and a payload. As used herein, the term "header field" generally refers to a component of a header section of a transmission packet that defines operating parameters of the transmission packet. For example, the header section may include information that identifies a device sending the transmission packet, a type of request included in the transmission packet, a protocol of the transmission packet, and/or a destination for the transmission packet. As used herein, the term "payload" generally refers to the body and/or the essential data of a transmission packet. In some examples, the payload may include information identifying content requested by a transmission packet and/or describing any other action requested by a sending device.

In some embodiments, original request message 208 may include a request to perform a certain action. As an example, original request message 208 may request that server 206 send a software update to computing device 202 for software installed on computing device 202. As another example, original request message 208 may request that server 206 send a notification to computing device 202. For instance, original request message 208 may request that server 206 send a notification about a security risk detected on computing device 202, a notification about an available update for software installed on computing device 202, an installation package for software, an instruction relating to intrusion prevention, and/or any other information and/or data relating to a service provided to computing device 202 by server 206.

As another example, original request message 208 may request that server 206 change a policy for sending notifications to computing device 202. For instance, original request message 208 may request that server 206 change a policy based on a changed configuration setting on computing device 202. As another example, original request message 208 may request that server 206 scan computing device 202. For example, original request message 208 may request that server 206 scan computing device 202 for malware. As another example, original request message 208 may request that server 206 update information stored on server 206 that describes a configuration of computing device 202. As a further example, original request message 208 may request that server 206 receive information describing a change in a status of computing device 202. For example, original request message 208 may indicate that computing device 202 has changed its preferences for what types of notifications to send to a user of computing device 202. As another example, original request message 208 may request that server 206 forward a log event to computing device 202.

Subsequent request message 210 generally represents any type or form of digital message and/or transmission packet and/or portion of a digital message and/or transmission packet that includes data, metadata, and/or information and that excludes at least a portion of original request message 208. As with original request message 208, examples of subsequent request message 210 include, without limitation, an HTTP request, an HTTP POST request, and HTTP GET request, and/or an HTTP PUT request. As with original request message 208, in some examples, subsequent request message 210 may include a header field and a payload. As with original request message 208, subsequent request message 210 may include a request from computing device 202 for server 206 to perform an action.

Original response message 212 generally represents any type or form of digital message and/or portion of a digital message that includes data, metadata, and/or information and that responds to original request message 208. As with original request message 208, examples of original response message 212 include, without limitation, an HTTP request, an HTTP POST request, and HTTP GET request, and/or an HTTP PUT request. As with original request message 208, in some examples, original response message 212 may include a header field and a payload.

Subsequent response message 214 generally represents any type or form of digital message and/or portion of a digital message that includes data, metadata, and/or information and that excludes at least a portion of original response message 212. In some examples, subsequent response message 214 may respond to subsequent request message 210. In some examples, subsequent request message 210 may represent an HTTP request. As with original request message 208, examples of subsequent response message 214 include, without limitation, an HTTP request, an HTTP POST request, and HTTP GET request, and/or an HTTP PUT request. As with original request message 208, in some examples, subsequent response message 214 may include a header field and a payload.

Figure 3:
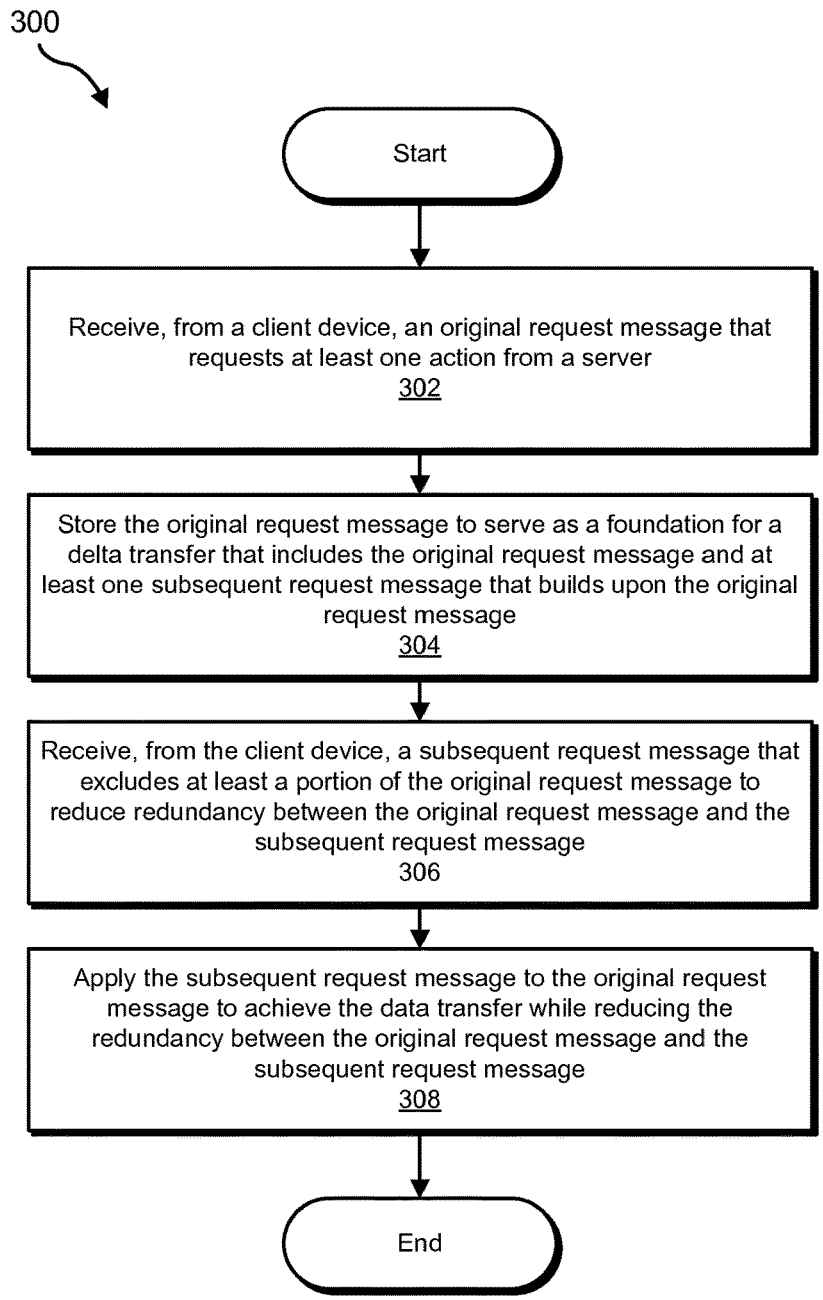
FIG. 3 is a flow diagram of an exemplary method for reducing network traffic by using delta transfers.

FIG. 3 is a flow diagram of an exemplary computer-implemented method 300 for reducing network traffic by using delta transfers. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may receive, from a client device, an original request message that requests at least one action from a server. For example, receiving module 104 may, as part of server 206 in FIG. 2, receive original request message 208 from computing device 202. In this example, original request message 208 may request at least one action from server 206.

Receiving module 104 may perform step 302 in a variety of ways and/or contexts. In some examples, receiving module 104 may operate as part of a server hosting a website. In these examples, receiving module 104 may receive original request message 208 by way of a request-response protocol. For example, receiving module 104 may receive original request message 208 by way of HTTP. In these examples, receiving module 104 may receive original request message 208 from a web browser of computing device 202 in connection with the website hosted by the server.

In some examples, receiving module 104 may be configured to receive requests from computing device 202 for services related to the security of computing device 202, such as requests to receive threat notifications and/or requests to scan computing device 202 for malware. For example, receiving module 104 may operate as part of a security service that provides security services for computing device 202. In this example, original request message 208 may request an action related to the security services. Additionally or alternatively, receiving module 104 may be configured to receive requests from another server operating as part of the same security service. In this example, original request message 208 may represent an inter-server communication.

In one example, receiving module 104 may receive an indication that computing device 202 is delta transfer enabled. For example, original request message 208 may include an indication that computing device 202 is able to facilitate delta transfers. In this example, receiving module 104 may identify the indication included in original request message 208.

As used herein, the term "delta transfer" generally refers to any type or form of process and/or procedure by which multiple messages build upon one another to convey information. For example, a delta transfer may refer to a combination of a base message and a subsequent message. In this example, the combination may include content from both the base message and the subsequent message.

In some examples, original request message 208 may include the indication that computing device 202 is able to facilitate delta transfers in a pre-defined header of original request message 208. In one embodiment, action module 110 may respond to original request message 208 by sending original response message 212 to computing device 202.

At step 304, one or more of the systems described herein may store the original request message to serve as a foundation for a delta transfer that includes the original request message and at least one subsequent request message that builds upon the original request message. For example, storage module 106 may, as part of server 206, store original request message 208 to serve as a foundation for a delta transfer that includes original request message 208 and at least one subsequent request message (such as subsequent request message 210) that builds upon original request message 208.

Storage module 106 may perform step 304 in a variety of ways and/or contexts. In some examples, storage module 106 may store original request message 208 by caching at least a portion of original request message 208. For example, storage module 106 may cache original request message 208 at server 206. In these examples, storage module 106 may cache original request message 208 in anticipation of applying a subsequent request message to original request message 208 to achieve a delta transfer.

In some examples, storage module 106 may store original request message 208 in its entirety. Additionally or alternatively, storage module 106 may store only a portion of original request message 208.

In some examples, storage module 106 may create a template based on content extracted from the original request message 208 and store the created template. In these examples, the template may include additional data to facilitate future delta transfers. For example, the template may include instructions for combining the content extracted from an original request message with content from subsequent request messages. As another example, the template may include identification information that enables server 206 to determine which subsequent request messages correspond to the template. In one example, the template may be a dynamic template that is updated with data from subsequent request messages (such as subsequent request message 210).

In some examples, storage module 106 may logically associate the stored content with an identifier. In these examples, receiving module 104 may utilize the identifier to match the stored content with subsequent received messages that include the same identifier.

In one example, storage module 106 may store original request message 208 in response to a determination that computing device 202 is able to facilitate delta transfers. For example, storage module 106 may store original request message 208 in response to the indication identified within original request message 208 that computing device 202 is able to facilitate delta transfers.

At step 306, one or more of the systems described herein may receive, from the client device, a subsequent request message that excludes at least a portion of the original request message to reduce redundancy between the original request message and the subsequent request message. For example, receiving module 104 may, as part of server 206 in FIG. 2, receive subsequent request message 210 from computing device 202. In this example, subsequent request message 210 may exclude at least a portion of original request message 208 to reduce redundancy between original request message 208 and subsequent request message 210.

Receiving module 104 may perform step 306 in a variety of ways and/or contexts. For example, receiving module 104 may operate as part of a server hosting a website, as discussed above in connection with step 302. In these examples, receiving module 104 may receive subsequent request message 210 by way of a request-response protocol. For example, receiving module 104 may receive subsequent request message 210 by way of HTTP. In this example, receiving module 104 may receive subsequent request message 210 from a web browser of computing device 202 in connection with the website hosted by the server.

In some examples, receiving module 104 may be configured to receive requests from computing device 202 for services related to the security of computing device 202, as discussed above in connection with step 302. For example, receiving module 104 may operate as part of a security service that provides security services for computing device 202. In this example, subsequent request message 210 may request an action related to the security services. Additionally or alternatively, receiving module 104 may be configured to receive requests from another server operating as part of the same security service, as discussed above in connection with step 302. In this example, subsequent request message 210 may represent an inter-server communication.

In some examples, subsequent request message 210 may be directed to requesting the same action requested by original request message 208. Additionally or alternatively, subsequent request message 210 may be directed to modifying original request message 208. For example, subsequent request message 210 may be directed to requesting a change in a policy. As a specific example, subsequent request message 210 may be directed to requesting to change a policy governing the types of notifications to send to computing device 202 and/or to change a policy governing how frequently to send notifications to computing device 202. For example, original request message 208 may request to receive notifications once a day, and subsequent request message 210 may request to change the notification frequency to once a week.

In some examples, subsequent request message 210 may represent a delta change of original request message 208. In one example, subsequent request message 210 may convey the delta change of original request message 208 by excluding content that is redundant to content included in original request message 208 and including content that is different than content included in original request message 208.

In some examples, subsequent request message 210 may exclude content that is identical to content included in original request message 208. Additionally or alternatively, subsequent request message 210 may exclude non-identical content that conveys information that has already been conveyed in original request message 208. In some examples, subsequent request message 210 may identify content and include an instruction to add the identified content to original request message 208 and/or subtract the identified content from original request message 208.

In some examples, computing device 202 may include a delta creation module. In these examples, the delta creation module may have created and/or processed subsequent request message 210 to reduce redundancy between original request message 208 and subsequent request message 210 prior to sending subsequent request message 210. For example, the delta creation module included in computing device 202 may identify information that describes an action that computing device 202 is requesting that server 206 perform and/or that would enable server 206 to perform the requested action. In this example, the delta creation module may also identify a subset of the information that has previously been transmitted to server 206. For example, the delta creation module may determine that the subset of information was previously transmitted as part of original request message 208. In response to identifying the subset of information previously transmitted to server 206, the delta creation module may exclude the subset of information from subsequent request message 210.

In one example, the delta creation module included in computing device 202 may create subsequent request message 210 by identifying differences between the content in original request message 208 and the information that describes the action that computing device 202 is now requesting from server 206. In this example, the delta creation module may create subsequent request message 210 by including content that conveys the identified differences.

Figure 4:
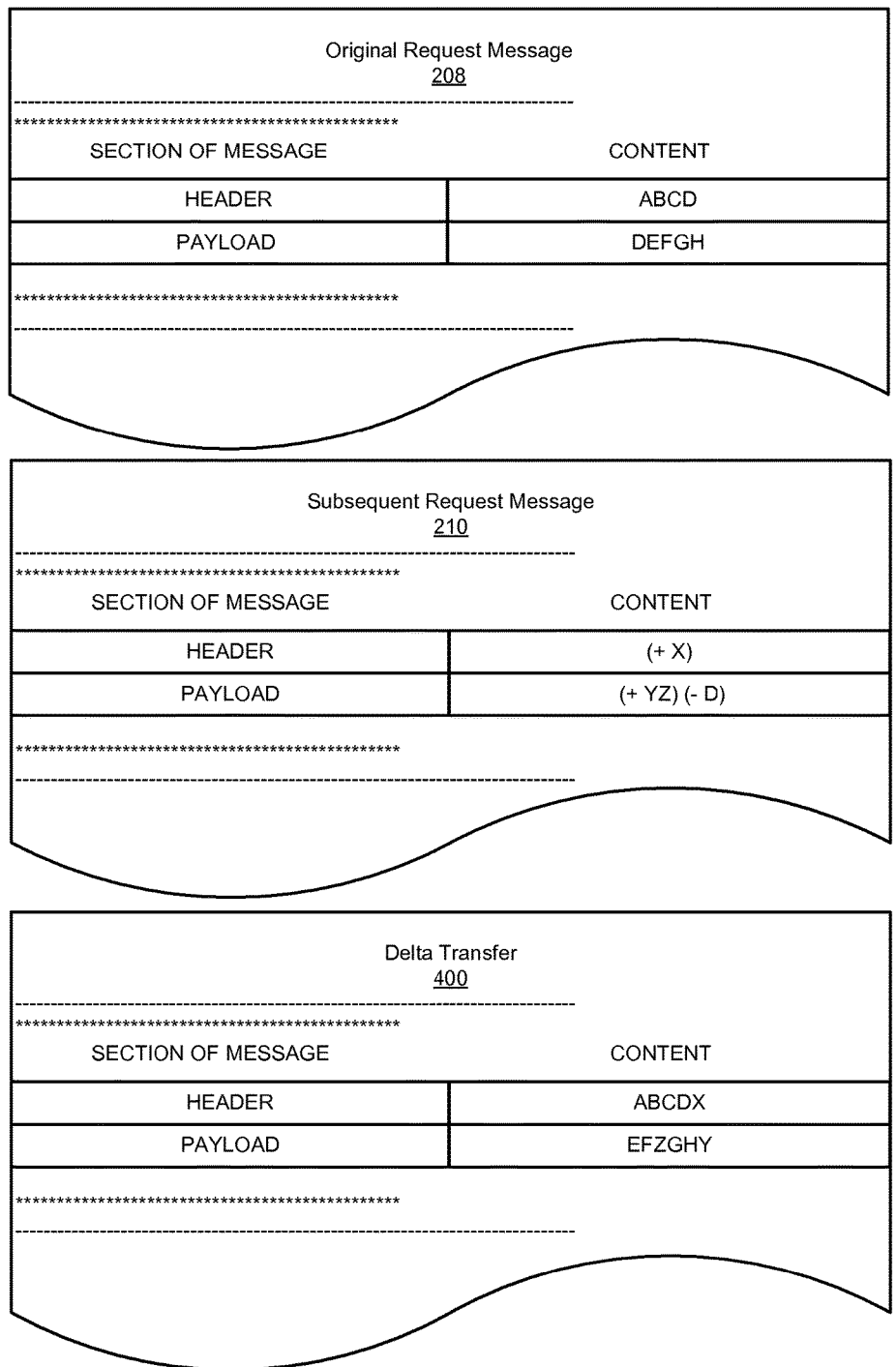
FIG. 4 is a block diagram of an exemplary original request message, an exemplary subsequent request message, and an exemplary delta transfer.

As a specific example, receiving module 104 may receive original request message 208 in FIG. 4 and later receive subsequent request message 210 in FIG. 4. As illustrated in FIG. 4, original request message 208 may include content "ABCD" in a header of original request message 208 and content "DEFGH" in a payload of original request message 208. In this example, computing device 202 may decide to perform a delta transfer with header content "ABCDX" and payload content "EFZGHY" based on original request message 208.

Accordingly, computing device 202 may determine that the header of original request message 208 includes the content "ABCD" and the payload of original request message 208 includes the content "DEFGH." Computing device 202 may then determine that the content "X" is not included in the header of original request message 208 and that the content "YZ" is not included in the payload of original request message 208. As such, computing device 202 may include the content "X" in the header of subsequent request message 210 in FIG. 4 and an instruction for server 206 to add the content "X" to the content previously included in the header of original request message 208 to achieve the delta transfer. Similarly, computing device 202 may include the content "YZ" in the payload of subsequent request message 210 and an instruction for server 206 to add the content "YZ" to the content previously included in the header of original request message 208 to achieve the delta transfer.

In some embodiments, computing device 202 may exclude the content "ABCD" from the header of subsequent request message 210 and the content "EFGH" from the payload of subsequent request message 210 since such content has been transmitted previously as part of original request message 208.

In some examples, computing device 202 may determine that content "D" is included in the payload of original request message 208 but that content "D" is not included in the information of the delta transfer that computing device 202 has decided to transmit to server 206. As such, computing device 202 may include content "D," or content identifying "D," in the payload of subsequent request message 210 in FIG. 4 along with an instruction to remove the "D" content from the content previously included in the payload of original request message 208 to achieve the delta transfer.

Returning to FIG. 3, in some embodiments, the portion of original request message 208 excluded by subsequent request message 210 may include information used by server 206 in performing the action requested by subsequent request message 210. For example, the portion of original request message 208 excluded by subsequent request message 210 may include and/or represent information describing hardware and/or software of computing device 202. Additionally or alternatively, the portion of original request message 208 excluded by subsequent request message 210 may include and/or represent registration information, entity information, and/or channel information of computing device 202. As used herein, the term "entity information" generally refers to information that uniquely identifies an entity sending a request message. As used herein, the term "channel information" generally refers to information describing an action requested by a request message.

At step 308, one or more of the systems described herein may apply the subsequent request message to the original request message to achieve the delta transfer while reducing the redundancy between the original request message and the subsequent request message. For example, delta module 108 may, as part of server 206 in FIG. 2, apply subsequent request message 210 to original request message 208 to achieve the delta transfer while reducing the redundancy between original request message 208 and subsequent request message 210.

Delta module 108 may perform step 308 in a variety of ways and/or contexts. In some examples, delta module 108 may apply subsequent request message 210 to original request message 208 by adding content included in subsequent request message 210 to original request message 208 in the manner indicated in subsequent request message 210. Similarly, delta module 108 may apply subsequent request message 210 to original request message 208 by subtracting content included in subsequent request message 210 from original request message 208 in the manner indicated in subsequent request message 210.

As a specific example, delta module 108 may achieve delta transfer 400 in FIG. 4 by applying subsequent request message 210 in FIG. 4 to original request message 208 in FIG. 4 as indicated in subsequent request message 210 in FIG. 4. For example, delta module 108 may add header content "X" from subsequent request message 210 in FIG. 4 to header content "ABCD" from original request message 208 in FIG. 4 to achieve the delta transfer header "ABCDX." Similarly, delta module 108 may add the payload content "YZ" to the payload content "DEFGH" and remove the payload content "D" from the payload content "DEFGH" to achieve the delta transfer payload "EFZGHY," as illustrated by delta transfer 400 in FIG. 4.

In some examples, subsequent request message 210 may include an instruction to inject new content into a specific location within the payload of original request message 208. In these examples, delta module 108 may inject a portion of the new content identified in subsequent request message 210 at the beginning, middle, or end of the payload of original request message 208 as indicated in subsequent request message 210. For example, delta module 108 may achieve delta transfer 400 illustrated in FIG. 4 by following an instruction to insert content "Z" between content "F" and content "G."

As another specific example, receiving module 104 may receive an original request message with entity information that identifies "Mike's mobile phone" as the device transmitting the request message and with channel information that identifies "policy synchronization" as the action being requested by the request message. Receiving module 104 may also receive a subsequent request message that includes a revision that is different from the original request message. In this example, the subsequent request message may exclude all entity information and/or channel information.

Also in this example, delta module 108 may determine that the subsequent request message is a delta change of the original request message and interpret the lack of entity information and channel information as an instruction to achieve the delta transfer by extracting this information from the original request message. For example, delta module 108 may extract the entity information identifying "Mike's mobile phone" and/or the channel information identifying "policy synchronization" from the original request message. Additionally or alternatively, delta module 108 may be configured to automatically extract the entity and/or channel from a base request message (such as original request message 208) when performing delta transfers.

In one example, delta module 108 may merge at least one delta change received from subsequent request message 210 into the stored original request message such that the merged request message may serve as a foundation for a delta transfer that includes the merged request message and at least one additional subsequent request message.

In some embodiments, the methods and systems described herein may further include performing the action requested in original request message 208. For example, an action module 110 may send, to computing device 202, original response message 212 that includes content related to the action requested by original request message 208. In some examples, the content included in original response message 212 may include a notification requested in original request message 208. In some examples, action module 110 may send original response message 212 through an HTTP persistent connection. As used herein, the term "HTTP persistent connection" refers to a network connection between two computing devices (such as a server and a client device) that is used to send and response multiple HTTP request/response pairs, without closing and reopening a new network connection between each request/response pair.

In some embodiments, action module 110 may also send, to computing device 202, subsequent response message 214. In some examples, action module 110 may send subsequent response message 214 in response to the completion of the data transfer. In one example, subsequent response message 214 may exclude at least a portion of original response message 212 in an effort to reduce redundancy between original response message 212 and subsequent response message 214, thereby reducing the volume of redundant data transmitted over network 204 between computing device 202 and server 206.

In some examples, action module 110 may send subsequent response message 214 through an HTTP persistent connection. For example, action module 110 may send subsequent response message 214 through a same HTTP persistent connection used to send original response message 212 and/or receive original request message 208 and/or subsequent request message 210. In some examples, subsequent response message 214 may include content related to the action requested by subsequent request message 210.

Action module 110 may create and/or process subsequent response message 214 using any of the methodologies used by computing device 202 to create and/or process subsequent request message 210 as discussed above in connection with step 306. In some examples, action module 110 may exclude entity and channel information from subsequent response message 214 based on a determination that entity and channel information was included in original response message 212 and has not changed since the transmission of original response message 212.

As explained above in connection with method 300, by excluding certain redundant content from messages transmitted across a network, the systems and methods described herein may reduce the amount of network traffic and the amount of bandwidth consumed by such network traffic. As a result, the systems and methods described herein may reduce network overhead and latency. In some examples, the amount of content excluded from a given message may be small and have little effect on network traffic. However, in the aggregate, the amount of content excluded from a large number of messages may be significant enough to meaningfully reduce overall network traffic, bandwidth consumption, network overhead, and/or latency.

Figure 5:
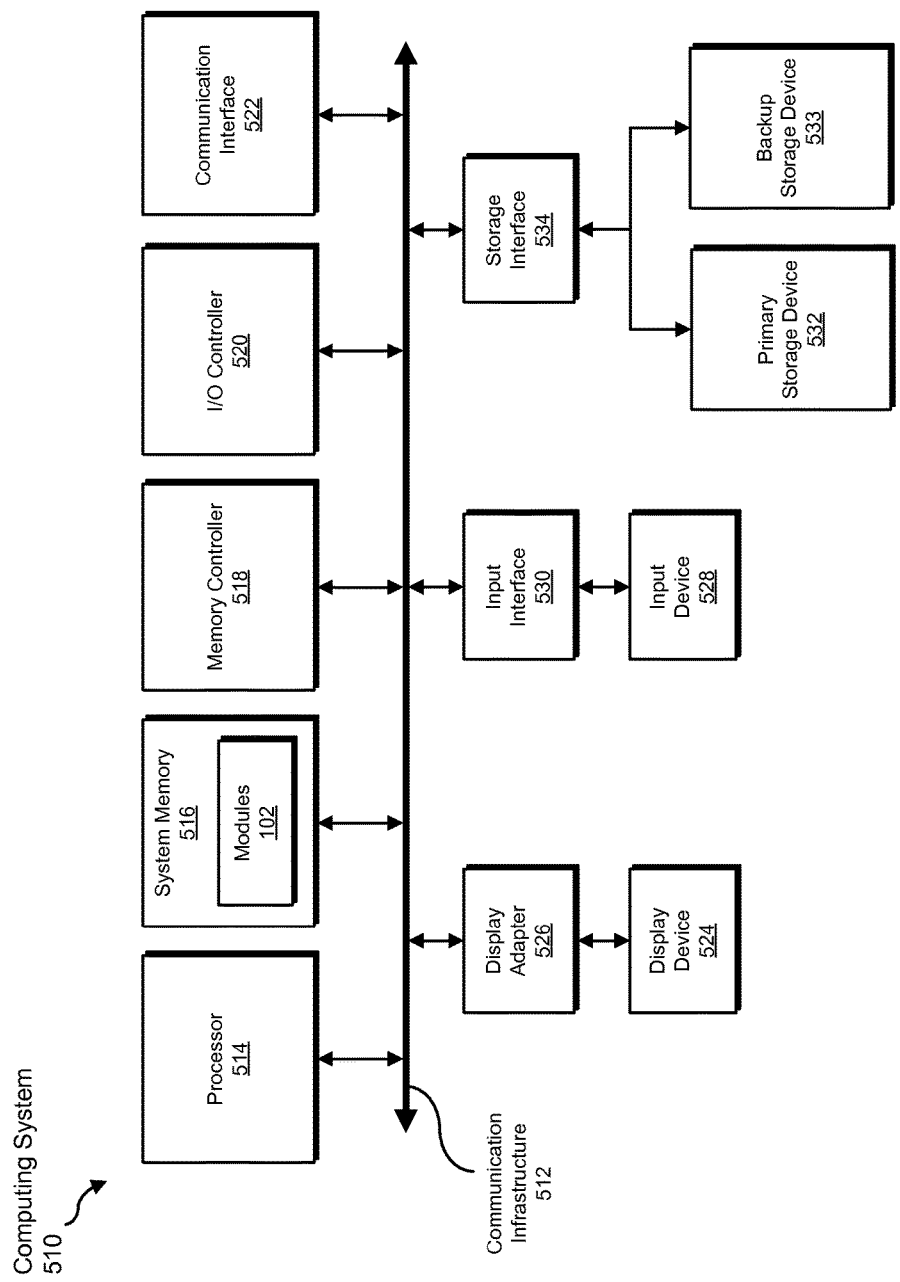
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
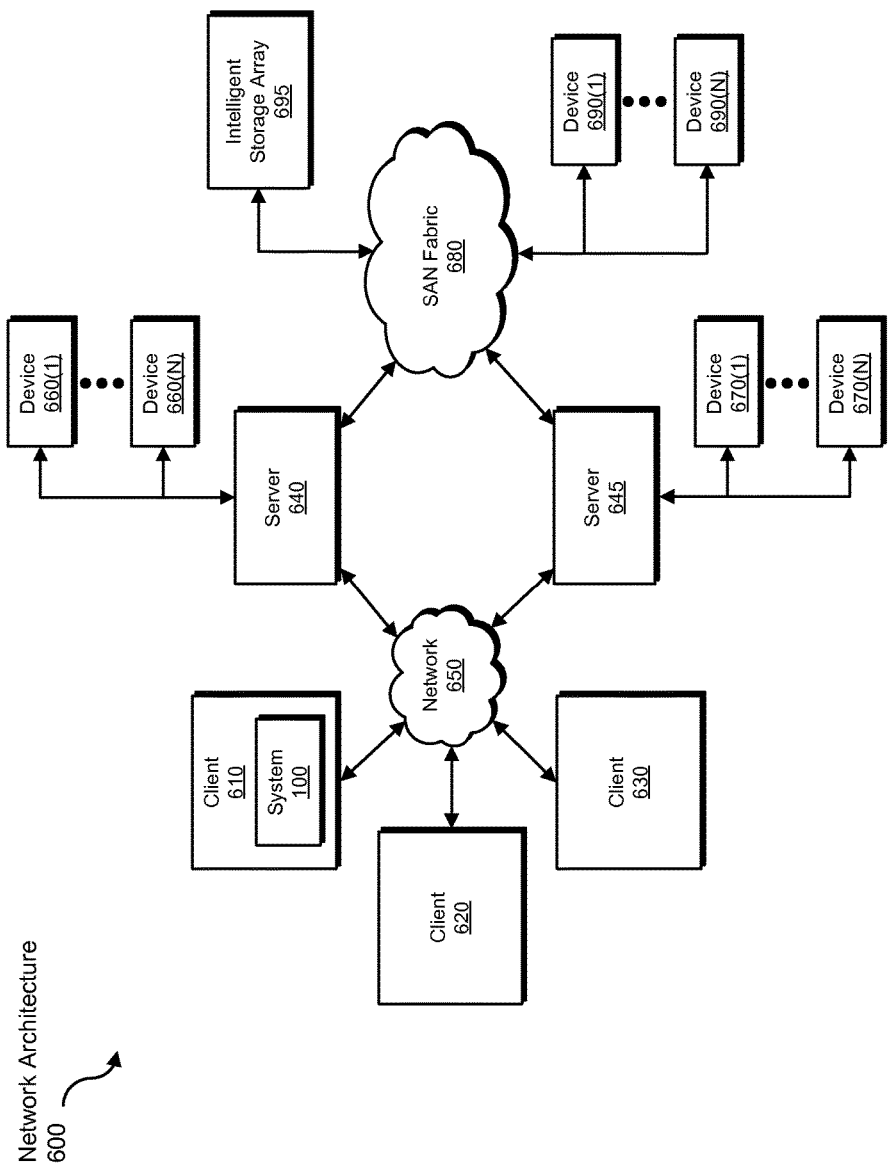
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for reducing network traffic by using delta transfers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive transform an HTTP request message into a message that only includes a delta change of a previous HTTP request message. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for reducing network traffic by using delta transfers, at least a portion of the method being performed by a computing device comprising at least one processor, the method comprising:
receiving, from a client device, an original request message that requests that a security server send a notification about a security risk detected on the client device, wherein:
the original request message comprises a pre-defined header that includes an indication that the client device is able to facilitate delta transfers; and
the original request message comprises a HyperText Transfer Protocol (HTTP) request sent through an HTTP persistent connection used to send and respond to multiple HTTP request/response pairs without closing and reopening a new network connection between each request/response pair;
in response to the indication that the client device to able to facilitate delta transfers, creating a template based on content extracted from the original request message, the template comprising instructions for combining the content extracted from the original request message with content from subsequent request messages;
storing the template at the security server to serve as a foundation for a delta transfer that includes the original request message and at least one subsequent request message that builds upon the original request message;
receiving, from the client device, a plurality of subsequent request messages, sent through the HTTP persistent connection, that exclude at least a portion of the original request message to reduce redundancy between the original request message and each subsequent request message within the plurality of the subsequent request messages, wherein:
the plurality of subsequent request messages comprises at least one of:
a subsequent request message that requests that the security server send a subsequent notification about a subsequent security threat detected on the client device;

a subsequent request message that requests to change a policy governing the types of notifications to send to the client device; and a subsequent request message that requests to change a policy governing how frequently to send notifications to the client device;

the amount of content excluded from the first subsequent request message within the plurality of subsequent request messages is smaller than a threshold size; and the aggregate amount of content excluded from the plurality of subsequent request messages is above the threshold size; and applying each subsequent request message within the plurality of subsequent request messages to the stored template to achieve the delta transfer while reducing the redundancy between the original request message and each of the subsequent request messages.

2. The computer-implemented method of claim 1, wherein storing the template at the security server comprises caching the template at the security server in anticipation of applying the subsequent request message to the template to achieve the delta transfer.

3. The computer-implemented method of claim 1, wherein the security server utilizes an endpoint management platform to provide security services for the client device.

4. The computer-implemented method of claim 1, wherein the portion of the original request message excluded by each subsequent request message comprises at least one of:
information describing hardware of the client device;
information describing software of the client device;
registration information of the client device;
information to be used by the security server in performing an action requested by the subsequent request message; and
information that identifies an entity or a channel.

5. The computer-implemented method of claim 1, wherein the portion of the original request message excluded by each subsequent request message comprises at least one of:
at least a portion of a header field of the original request message; and
at least a portion of a payload of the original request message.

6. The computer-implemented method of claim 1, wherein the template comprises a dynamic template that is updated with data from each subsequent request message.

7. The computer-implemented method of claim 1, wherein the original request message comprises at least one of:
an HTTP POST request;
an HTTP GET request; and
an HTTP PUT request.

8. The computer-implemented method of claim 1, wherein the security server comprises a server hosting a security website.

9. The computer-implemented method of claim 8, wherein receiving the original request message comprises receiving the original request message from a web browser of the client device.

10. The computer-implemented method of claim 1, wherein each subsequent request message comprises a request message processed by the client device to exclude at least some content that is redundant to content included in the original request message.

11. The computer-implemented method of claim 1, further comprising:
sending, to the client device, an original response message that includes content related to the action requested by the original request message; and
sending, to the client device, a subsequent response message that excludes at least a portion of the original response message to reduce redundancy between the original response message and the subsequent response message.

12. The computer-implemented method of claim 11, wherein at least one of:
sending the original response message to the client device comprises sending the original response message using the HTTP persistent connection; and
sending the subsequent response message comprises sending the subsequent response message using the HTTP persistent connection.

13. The computer-implemented method of claim 11, further comprising, prior to sending the subsequent response message, creating the subsequent response message by excluding, from the subsequent response message, information that identifies an entity or a channel.

14. The computer-implemented method of claim 1, wherein:
receiving each subsequent request message comprises receiving a request message that includes content and an instruction directing the security server to at least one of:
add content to the original request message; and
subtract content from the original request message; and
applying each subsequent request message to the original request message comprises at least one of:
adding content to the original request message based at least in part on the instruction; and
subtracting content from the original request message based at least in part on the instruction.

15. A system for reducing network traffic by using delta transfers, the system comprising:
a receiving module, stored in memory, that:
receives, from a client device, an original request message that requests that a security server send a notification about a security risk detected on the client device, wherein:
the original request message comprises a pre-defined header that includes an indication that the client device is able to facilitate delta transfers; and
the original request message comprises a HyperText Transfer Protocol (HTTP) request sent through an HTTP persistent connection used to send and respond to multiple HTTP request/response pairs without closing and reopening a new network connection between each request/response pair;
creates, in response to the indication that the client device to able to facilitate delta transfers, a template based on content extracted from the original request message, the template comprising instructions for combining the content extracted from the original request message with content from subsequent request messages;
a storage module, stored in memory, that stores the template at the security server to serve as a foundation for a delta transfer that includes the original request message and at least one subsequent request message that builds upon the original request message;
wherein the receiving module receives, from the client device, a plurality of subsequent request messages, sent through the HTTP persistent connection, that exclude at least a portion of the original request message to reduce redundancy between the original request message and each subsequent request message within the plurality of subsequent request messages, wherein:
the plurality of subsequent request messages comprises at least one of:
a subsequent request message that requests that the security server send a subsequent notification about a subsequent security threat detected on the client device;
a subsequent request message that requests to change a policy governing the types of notifications to send to the client device; and
a subsequent request message that requests to change a policy governing how frequently to send notifications to the client device;
the amount of content excluded from the first subsequent request message within the plurality of subsequent request messages is smaller than a threshold size; and
the aggregate amount of content excluded from the plurality of subsequent request messages is above the threshold size;
a delta module, stored in memory, that applies each subsequent request message within the plurality of subsequent request messages to the stored template to achieve the delta transfer while reducing the redundancy between the original request message and each subsequent request message; and
at least one physical processor configured to execute the receiving module, the storage module, and the delta module.

16. The system of claim 15, wherein the storage module stores the template by caching the template at the security server in anticipation of applying one or more subsequent request messages to the template to achieve the delta transfer.

17. The system of claim 15, wherein the security server utilizes an endpoint management platform to provide security services for the client device.

18. The system of claim 15, wherein the portion of the original request message excluded by each subsequent request message comprises at least one of:
information describing hardware of the client device;
information describing software of the client device;
registration information of the client device;
information to be used by the security server in performing an action requested by the subsequent request message; and
information that identifies an entity or a channel.

19. The system of claim 15, wherein the portion of the original request message excluded by each subsequent request message comprises at least one of:
at least a portion of a header field of the original request message; and
at least a portion of a payload of the original request message.

20. A non-transitory computer-readable medium comprising one or more computer-readable instructions that, when executed by at least one processor of a computing device, cause the computing device to:
receive, from a client device, an original request message that requests that a security server send a notification about a security risk detected on the client device, wherein:
the original request message comprises a pre-defined header that includes an indication that the client device is able to facilitate delta transfers; and
the original request message comprises a HyperText Transfer Protocol (HTTP) request sent through an HTTP persistent connection used to send and respond to multiple HTTP request/response pairs without closing and reopening a new network connection between each request/response pair;
in response to the indication that the client device to able to facilitate delta transfers, create a template based on content extracted from the original request message, the template comprising instructions for combining the content extracted from the original request message with content from subsequent request messages;
store the template at the security server to serve as a foundation for a delta transfer that includes the original request message and at least one subsequent request message that builds upon the original request message;
receive, from the client device, a plurality of subsequent request messages, sent through the HTTP persistent connection, that exclude at least a portion of the original request message to reduce redundancy between the original request message and each subsequent request message of the plurality of subsequent request messages, wherein:
the plurality of subsequent request messages comprises at least one of:
a subsequent request message that requests that the security server send a subsequent notification about a subsequent security threat detected on the client device;
a subsequent request message that requests to change a policy governing the types of notifications to send to the client device; and
a subsequent request message that requests to change a policy governing how frequently to send notifications to the client device;
the amount of content excluded from the first subsequent request message within the plurality of subsequent request messages is smaller than a threshold size; and
the aggregate amount of content excluded from the plurality of subsequent request messages is above the threshold size; and
apply each subsequent request message within the plurality of subsequent request messages to the stored template to achieve the delta transfer while reducing the redundancy between the original request message and each of the subsequent request messages.

* * * * *